United States Patent
Rosca et al.

(10) Patent No.: US 7,088,831 B2
(45) Date of Patent: Aug. 8, 2006

(54) REAL-TIME AUDIO SOURCE SEPARATION BY DELAY AND ATTENUATION COMPENSATION IN THE TIME DOMAIN

(75) Inventors: Justinian Rosca, Princeton, NJ (US); Ning Ping Fan, Plainsboro, NJ (US); Radu Victor Balan, Levittown, PA (US)

(73) Assignee: Siemens Corporate Research, Inc., Princeton, NJ (US)

( * ) Notice: Subject to any disclaimer, the term of this patent is extended or adjusted under 35 U.S.C. 154(b) by 783 days.

(21) Appl. No.: 10/010,255

(22) Filed: Dec. 6, 2001

(65) Prior Publication Data
US 2003/0112983 A1  Jun. 19, 2003

(51) Int. Cl.
*H04R 3/00* (2006.01)
(52) U.S. Cl. .......................... 381/92; 381/66; 702/190
(58) Field of Classification Search .................. 381/66, 381/92; 702/190
See application file for complete search history.

(56) References Cited

U.S. PATENT DOCUMENTS

| 5,208,786 | A | * | 5/1993 | Weinstein et al. ........... 367/124 |
| 5,515,445 | A | * | 5/1996 | Baumhauer et al. ........... 381/92 |
| 5,694,474 | A | * | 12/1997 | Ngo et al. ..................... 381/92 |
| 6,317,703 | B1 | | 11/2001 | Linsker ....................... 702/190 |
| 2001/0031053 | A1 | * | 10/2001 | Feng et al. .................... 381/92 |

* cited by examiner

*Primary Examiner*—Brian T. Pendleton
(74) *Attorney, Agent, or Firm*—Alexander J. Burke; F. Chau & Associates, LLC

(57) ABSTRACT

A system is provided for separating two audio channels recorded by an array of microphones. The system includes a calibration module for normalizing gain levels between a plurality of channels on each of a plurality of date frames, wherein each data frame is expressed in terms of time. The system further includes a delay parameter estimation module for accepting an output comprising the normalized channels, and estimating a delay parameter for a plurality of data frame sizes over a plurality of lag times, and sorting delays to generate corresponding source separated outputs.

15 Claims, 6 Drawing Sheets

REAL-TIME AUDIO SOURCE SEPARATION BY DELAY AND ATTENUATION COMPENSATION IN THE TIME DOMAIN

BACKGROUND OF THE INVENTION

1. Field of the Invention

The present invention is related to processing audio data, and more particularly to audio source separation in anechoic environments.

2. Discussion of Prior Art

There is increased interest in using microphone arrays in a variety of audio source separation and consequently speech processing applications. Small arrays of microphones have improved on single microphone systems in speech separation and directional detection of sources for hands free communication and a variety of other speech enhancement and audio source separation applications. Blind or parametric source separation approaches have been applied to distinguish between input from different microphones but with limited success. Challenges such as reverberation, noise, and acoustical echoes still plague many approaches to blind separation of audio signals.

One method for automatically compensating for attenuation due to differences in the calibration of the microphones has been attempted, which implements a deconvolution stage on the order of about a thousand taps. This is computationally expensive and may be difficult to implement in real-time.

A mixing model has been proposed wherein a decorrelation criterion is determined for integer delays, therefore the approach assumes that the distance between the microphones is less than the distance from the sources. However, such assumptions about sources being far-field may not hold well, and thus the model may not be a good approximation of the environment. Another proposed refinement to the mixing model includes higher order tap coefficients. The overall model corresponds to a constrained physical situation.

Another set of related spatial filtering techniques are antenna array processing techniques. Such techniques assume information about the microphone array layout as a given. For example, a delay and attenuation compensation (DAC) separation approach does not necessarily make this assumption, however weaker information such as the distance or a bound on the distance between sensors can help during a parameter estimation phase.

Still other proposed techniques use robust beamforming. Adaptive beamformers assume a known direction of arrival. Beamforming can be applied to source separation to deconvolve source estimates. Various source separation approaches have attempt to combine independent component analysis (ICA) or blind source separation (BSS) and elements of a beamformer to improve the performance of ICA/BSS techniques. However, no known system or method exists for real-time source separation by delay and attenuation compensation.

Therefore, a need exists for a system and method of real-time source separation by delay and attenuation compensation in a time domain.

SUMMARY OF THE INVENTION

According to an embodiment of the present invention, a method is provided for separating at least two audio channels recorded using an array of at least two microphones. The method equalizes variances of a first channel and a second channel on a current data frame, recursively expresses means and variances of mixtures, and normalizes the second channel to a variance level substantially similar to a variance of the first channel.

On a current block of m data samples $x_j(t)$, $1 \leq t \leq m$ $1 \leq j \leq 2$, and index k, a current block mean $\bar{x}_j$ can be determined according to:

$$\bar{x}_j = \frac{1}{m}\sum_{t=1}^{m} x_j(t)$$

A running mean $\bar{x}_j^{(k-1)}$ can be updated by:

$$\bar{x}_j^{(k)} = (1-\beta)\bar{x}_j^{(k-1)} + \beta\bar{x}_j$$

where $\beta$ is a learning rate.

A current block variance $Var_j$ is determined according to:

$$Var_j = \frac{1}{m}\sum_{t=1}^{m} |x_j(t) - \bar{x}_j^{(k)}|^2$$

A running variance $v_j^{(k-1)}$ is updated by:

$$v_j^{(k)} = (1-\beta)v_j^{(k-1)} + \beta Var_j$$

Normalizing the second channel further includes normalizing an average energy to be similar to an average energy of the first channel according to:

$$\hat{x}_2 = \sqrt{\frac{v_1^{(k)}}{v_2^{(k)}}}\, x_2$$

The method determines delay parameters by minimizing a cross-covariance between two sources. The cross-covariance between the outputs is expanded as:

$$R_{y_1y_2}(\tau) = R_{x_1x_1}(d_1 - d_2 + \tau) - R_{x_1x_2}(d_2 - \tau) - R_{x_1x_2}(d_1 + \tau) + R_{x_2x_2}(\tau)$$

where $R_{x_ix_j}$ is the cross-correlation between $x_i$ and $x_j$, $1 \leq i$, $j \leq 2$. The method further includes determining sub-unit-delayed versions of cross-correlations, wherein the delay parameters are determined for a number of lags L. According to an embodiment of the present invention, a system is provided for separating two audio channels recorded by an array of microphones. The system includes a calibration module for normalizing gain levels between a plurality of channels on each of a plurality of date frames, wherein each data frame is expressed in terms of time. The system further includes a delay parameter estimation module for accepting an output comprising the normalized channels, and estimating a delay parameter for a plurality of data frame sizes over a plurality of lag times, and sorting delays to generate corresponding source separated outputs.

The source separated outputs of the delay parameter estimation module are output in real-time.

The calibration module compensates for attenuations at the microphones.

The delay parameter determines relative delays of arrival of wave fronts at each microphone.

According to an embodiment of the present invention, a method is provided for separating at least two audio channels recorded using an array of at least two microphone. The method includes constraining a mixing model of the at least two audio channels in a time domain to direct path signal components, and defining a plurality of delays with respect to a midpoint between microphones, wherein delays depend on the distance between sensors and the speed of sound. The method further includes inverting a mixing matrix, corresponding to the mixing model, in the frequency domain, and compensating for a plurality of true fractional delays and attenuations in the time domain, wherein values of the delays and attenuations are determined from an output decorrelation constraint.

The method includes estimating a complex filter for each microphone, wherein the complex filters define the mixing model.

The mixing matrix corresponding to the mixing model comprises two delay parameters and two parameters corresponding to the speed of sound.

The output decorrelation constraint is a function of two unknown delays and unknown scalar coefficients. An attenuation coefficient has a value substantially equal to one.

The method imposes a minimum variance criterion for a reverberant case over all linear filtering combinations of $X_1$ and $X_2$.

According to an embodiment of the present invention, a program storage device is provided, readable by machine, tangibly embodying a program of instructions executable by the machine to perform method steps for separating at least two audio channels recorded using an array of at least two microphones. The method includes equalizing variances of a first channel and a second channel on a current data frame, recursively expressing means and variances of mixtures, and normalizing the second channel to a variance level substantially similar to a variance of the first channel.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 1A:
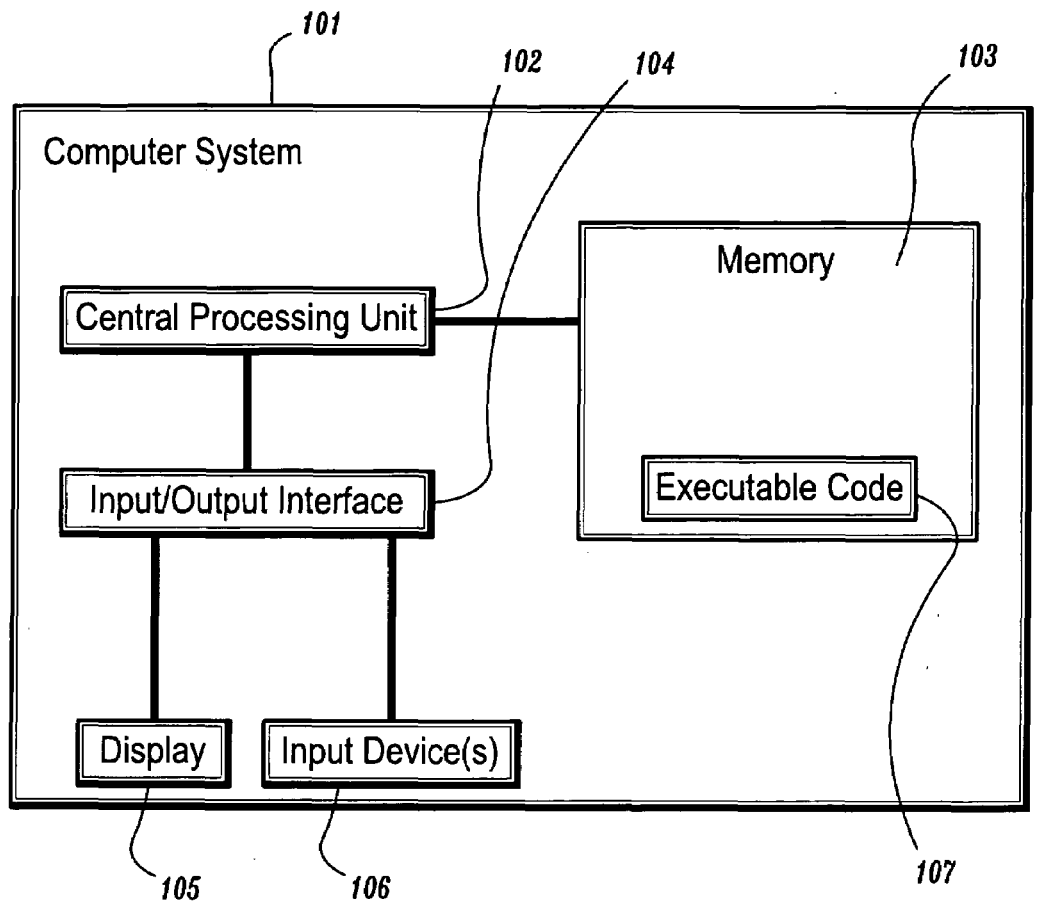
FIG. 1a is a diagram of a system for executing code according to an embodiment of the present invention.

The present invention provides a system and method for separating two or more audio signals recorded using an array of microphones assuming an anechoic mixture model. The complexity and performance factors of an embodiment of the present invention has been measured. One with ordinary skill in the art will appreciate that various other embodiments can be built upon these results.

Although elements of the present invention are derived from blind source separation principles, the system and method implement an anechoic propagation model to reduce the complexity of the mixing model and make it possible to effectively identify and invert a mixing process using second ordered statistics. For sources far away from the microphone array, for example, greater than one meter, the model can be simplified to depend on just a few parameters. According to an embodiment of the present invention, these parameters include relative delays in the arrival of wave fronts and attenuations at the microphones. The method estimates the parameters of a mixture to compensate for the true values according to a delay and attenuation compensation (DAC) method.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

According to an embodiment of the present invention, to achieve a real-time implementation of a source separation model, an estimation of the direction of arrival can be determined based on a cross-covariance. Further, variations in the microphones, such as differences in gain, can be accounted for. The system and method have been evaluated using a segmental signal-to-noise ratio (SNR) measure for a large collection of data collected in both anechoic and echoic environments.

Figure 1B:
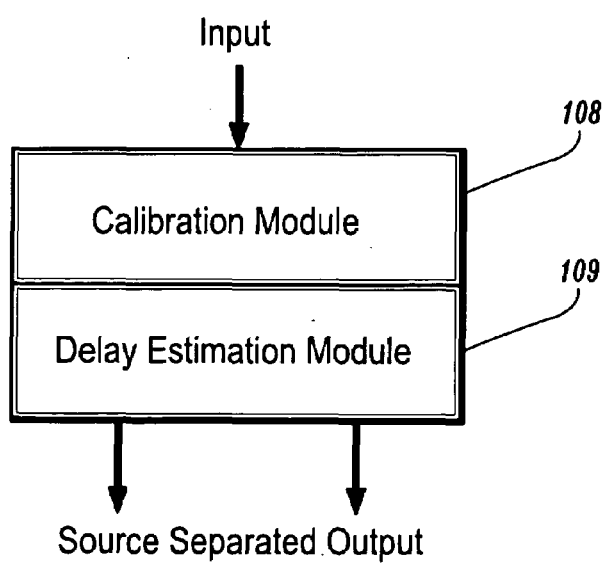
FIG. 1b is a diagram of a system for separating mixed input according to an embodiment of the present invention.

Referring to FIG. 1a, according to an embodiment of the present invention, a computer system 101 for implementing the present invention can comprise, inter alia, a central processing unit (CPU) 102, a memory 103 and an input/output (I/O) interface 104. The computer system 101 can be coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. As such, the computer system 101 is a general purpose computer system that becomes a specific purpose computer system when executing a program of instructions or executable code 107 of the present invention. As shown in FIG. 1b, a calibration module 108 and delay estimation module 109 can be provided in conjunction with a computer system as hardware or software.

A general convolutive model for the mixing of two source signals at two sensors can be written as:

$$x_1(t) = h_1 1 s_1(t) + h_2 1 s_2(t)$$
$$x_2(t) = s_1(t) + s_2(t) \quad (1)$$

where $h_i$ represents unknown relative transfer functions of the first sensor versus the second sensor, t is time, wherein t is an index in the current frame of data, and 1 represents convolution. $s_1$ and $s_2$ are the source signals.

With a low complexity source separation method, the treatment of the mixing problem can be simplified by considering only direct path signal components, rather than using a general convolutive propagation model. The component from one source arrives at the sensors with a fractional delay between the time of arrival at two closely spaced sensors. The fractional delay is a delay between sensors that is not generally an integer multiple of the sampling period and depends on the position of the source with respect to the array axis and the distance between sensors. The DAC mixing model in the time domain can be written as follows:

$$x_1(t) = s_1(t-\delta_1) + c_1 \exists s_2(t-\delta_2)$$
$$x_2(t) = c_2 \exists s_1(t+\delta_1) + s_2(t+\delta_2) \quad (2)$$

where: $c_1$, $c_2$ are two positive real numbers, accounting for non-calibrated microphones, and for deviations from the far-field assumption. $s_1$ and $s_2$ are two sources, and $x_1$ and $x_2$ are mixtures at the respective microphones. Equation 2 describes a mixing matrix for the mixing model in the time domain, in terms of four parameters, $\delta_1$, $\delta_2$, $c_1$, and $c_2$.

According to an embodiment of the present invention this mixing matrix is inverted. This can be performed in the frequency domain, and results in the following time domain solution:

$$y_1(t) = h(t,\delta_1,\delta_2,c_1,c_2) 1 (x_1(t+\delta_2) - c_1 x_2(t-\delta_2))$$
$$y_2(t) = h(t,\delta_1,\delta_2,c_1,c_2) 1 (-c_2 x_1(t+\delta_1) + x_2(t-\delta_1)) \quad (3)$$

where the convolutive filter h accounts for the division with the determinant of the mixing matrix. In practice the criteria above can be simplified to a decorrelation between fractionally delayed sensor recordings:

$$y_1(t) = x_1(t+d_1) - c_1 x_2(t)$$

$$y_2(t) = c_2 x_1(t+d_2) + x_2(t) \quad (4)$$

This is possible due to the freedom to shift signals under the assumption of decorrelation at any lag.

The DAC method performs source separation by compensating for the true fractional delays and attenuations in the time domain with values determined from an output decorrelation constraint:

$$R_{y1y2}(\tau) = E[y1(t)y2(t+\tau)] = 0, \forall \tau \quad (5)$$

as a function of two unknown delays $d_1$ and $d_2$ and unknown scalar (attenuation) coefficients $c_1$ and $c_2$. $E[\bullet]$ is the time average of the quantity between square brackets. Attenuation coefficients $c_1$ and $c_2$ have values close to one (1) (e.g., $c_1 \approx c_2 \approx 1$) under the far-field source assumption. This is equivalent to the following criterion:

$$\{\hat{d}_1, \hat{d}_2, \hat{c}_1, \hat{c}_2\} = \operatorname{argmin} \sum_\tau R_{y_1 y_2}(\tau) \quad (6)$$

A generalization of the solution in the reverberant case (e.g., Equation 1) can be obtained by imposing a minimum variance criterion, for example, $\operatorname{argmin}_{G_{i1};G_{i2}} \operatorname{Var}(Y_i - S_i)$ over all linear filtering combinations of $X_1$ and $X_2$:

$$Y_i = G_{i1} X_1 + G_{i2} X_2 \quad (7)$$

The implementation includes the estimation of complex filters $H_1$ and $H_2$ defining the mixing model in Equation 1:

$$Y(\omega) = \frac{1}{H_1 - H_2} \cdot \begin{bmatrix} 1 & -H_2 \\ 1 & H_1 \end{bmatrix} \cdot X \quad (8)$$

Complexity and performance characteristics of the simple method, particularly on real environment data can influence decisions for more complex approaches to deal with reverberant conditions.

According to an embodiment of the present invention, the method can simplify the delay estimation by dealing with attenuations in a calibration phase and evaluating output decorrelation based on the covariance of the mixtures. Calibration can be performed online. The calibration accounts for dissimilarities in microphones, e.g., neither identical nor calibrated off-line.

Figure 9:
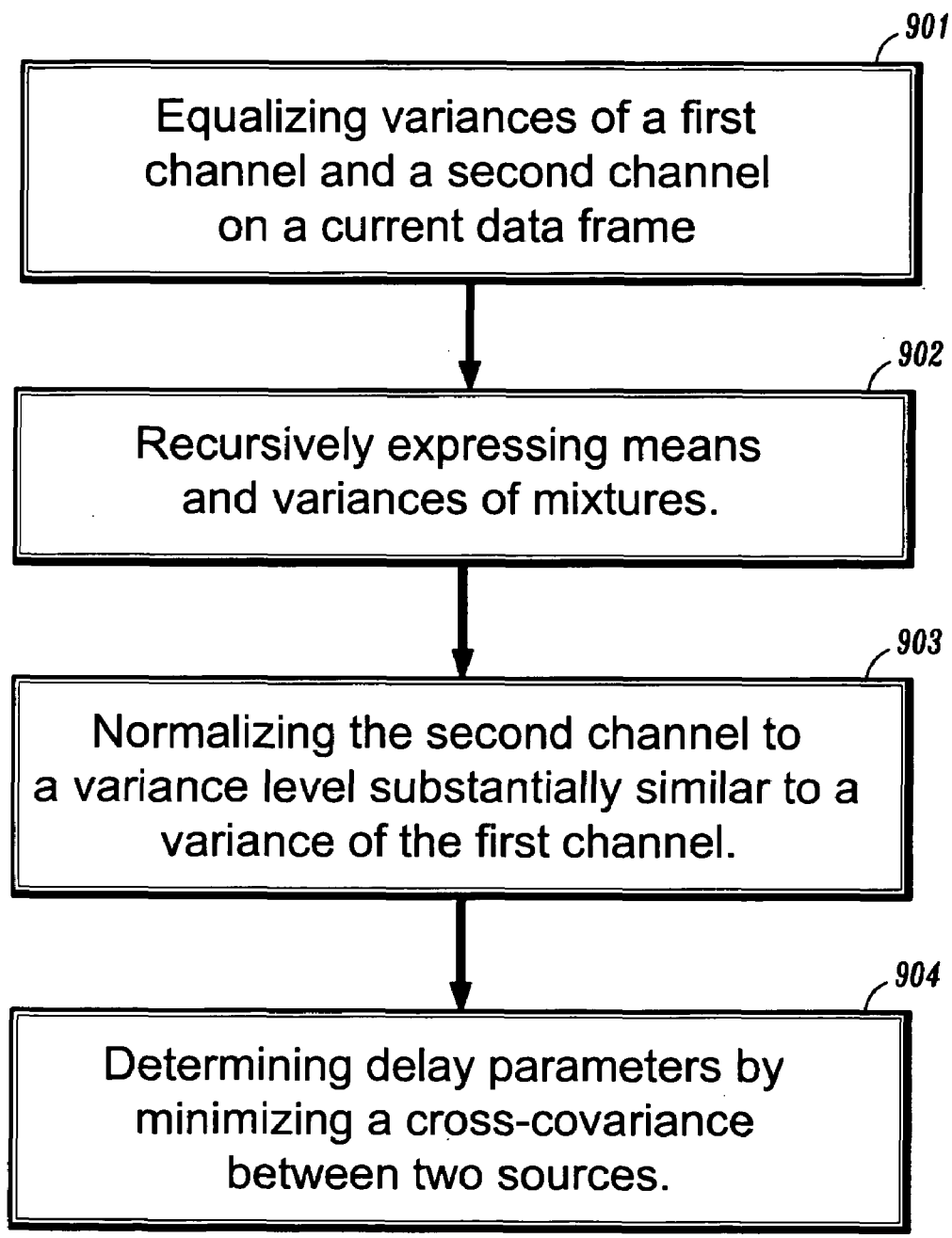
FIG. 9 is a flow chart of calibrating inputs and determining delays according to an embodiment of the present invention.

Ideally, $c_1 = c_2 = 1$ under the far-field assumption, and microphones have identical gain characteristics. In practice however, it can be difficult to impose the latter condition. Referring to FIG. 9, an online calibration criterion is provided for making gain levels commensurate on two channels, assuming a two microphone array. The variances of channels are equalized on a current data frame 901. The means and variances of the mixtures are recursively expressed 902, and the second channel is normalized to a variance level substantially similar to the first channel 903. On the current block of m data samples $x_j(t)$, $1 \leq t \leq m$ $1 \leq j \leq 2$, and index k, the current block mean $\bar{x}_j$ can be determined, for example, according to:

$$\bar{x}_j = \frac{1}{m} \sum_{t=1}^{m} x_j(t)$$

The running mean $\bar{x}_j^{(k-1)}$ can be updated by, for example:

$$\bar{x}_j^{(k)} = (1-\beta)\bar{x}_j^{(k-1)} + \beta \bar{x}_j$$

where $\beta$ is a learning rate, for example, $\beta=0.1$. The current block variance $Var_j$ can be determined according to, for example:

$$Var_j = \frac{1}{m}\sum_{t=1}^{m}|x_j(t) - \bar{x}_j^{(k)}|^2$$

The running variance $v_j^{(k-1)}$ can be updated by, for example:

$$v_j^{(k)} = (1-\beta)v_j^{(k-1)} + \beta Var_j$$

The second channel can be normalized so that its average energy to be similar to that of the first channel:

$$\hat{x}_2 = \sqrt{\frac{v_1^{(k)}}{v_2^{(k)}}} x_2$$

The recursive formulas above have a direct online implementation. Furthermore, the attenuation parameters in Equation 4 can be dropped, simplifying the estimation of delays.

The cross-covariance between $y_1$ and $y_2$, the outputs, can be expanded as follows:

$$R_{y_1 y_2}(\tau) = R_{x_1 x_1}(d_1-d_2+\tau) - R_{x_1 x_2}(d_2-\tau) - R_{x_1 x_2}(d_1+\tau) + R_{x_2 x_2}(\tau) \quad (10)$$

where $R_{x_i x_j}$ is the cross-correlation between $x_i$ and $x_j$, $1 \leq i, j \leq 2$.

Delay parameters can be estimated by minimizing this expression 904. Note that to determine sub-unit-delayed versions of cross-correlations, the delay parameters can be determined for a number of lags L.

TABLE 1

Real-time performance on a Pentium III 600 MHz for various values of L (number of lags) and window size.

|         | m = 512   | m = 1024 | m = 4096 |
|---------|-----------|----------|----------|
| L = 8   | 990 ms/s  | 500 ms/s | 200 ms/s |
| L = 10  | 1050 ms/s | 600 ms/s | 205 ms/s |
| L = 20  | 1500 ms/s | 750 ms/s | 260 ms/s |

A real-time application can be implemented as a multi-threaded Windows task on a Pentium III PC. The inputs can come from the auxiliary input of the standard PC sound card, while outputs are continuously streamed to, for example, headphones. At least one thread performs the I/O of audio data in real time. At least another thread is responsible for the analysis, calibration, delay estimation and synthesis of the demixed signals.

Calibrated data are fed into the delay parameter estimation module, which can use, for example, the Amoeba optimization method as taught by W. H. Press et al. *Numerical Recipes in C. Cambridge University Press,* 1988, to find a local solution. Delay values are constrained based on d, thus, the solution is global. Optimization uses the cost function (Equation 10), wherein an initial simplex can be selected including, for example, three pairs of delays. The initial simplex is centered at the delays of last data block $(d_1+0:05; d_2+0:05)$, $(d_1-0:05; d_2-0:05)$, and $(d_1+0:05; d_2-0:05)$ (in samples). Solutions $(d_1^*; d_2^*)$ of the optimization can be smoothed using a learning rate $\alpha$, the equation can be written as follows:

$$d_j = d_j^k = (1-\alpha) \cdot d_j^{k-1} + \alpha \cdot d_j^*, j=1,2 \quad (11)$$

Figure 5:
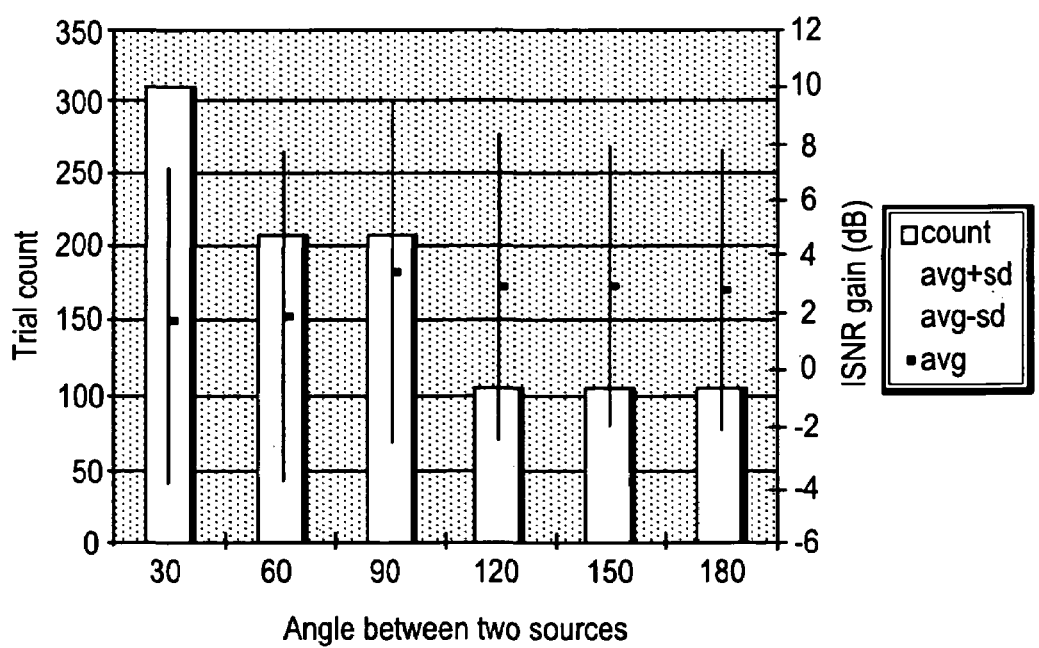
FIG. 5 shows a segmental SNR separation results as a function of the difference in angles of arrival for echoic data Set according to an embodiment of the present invention.

Delays can be sorted to insure stability to the permutation problem. The correspondence between delays and sources is unique when sources are not symmetrical with respect to the receiver axis. Thus, the sorted delays can be used to directly generate separated outputs. FIG. 5 presents performance measurements with this implementation.

According to an embodiment of the present invention, an important characteristic of the DAC approach is the artifact-free nature of the outputs.

Figure 2:
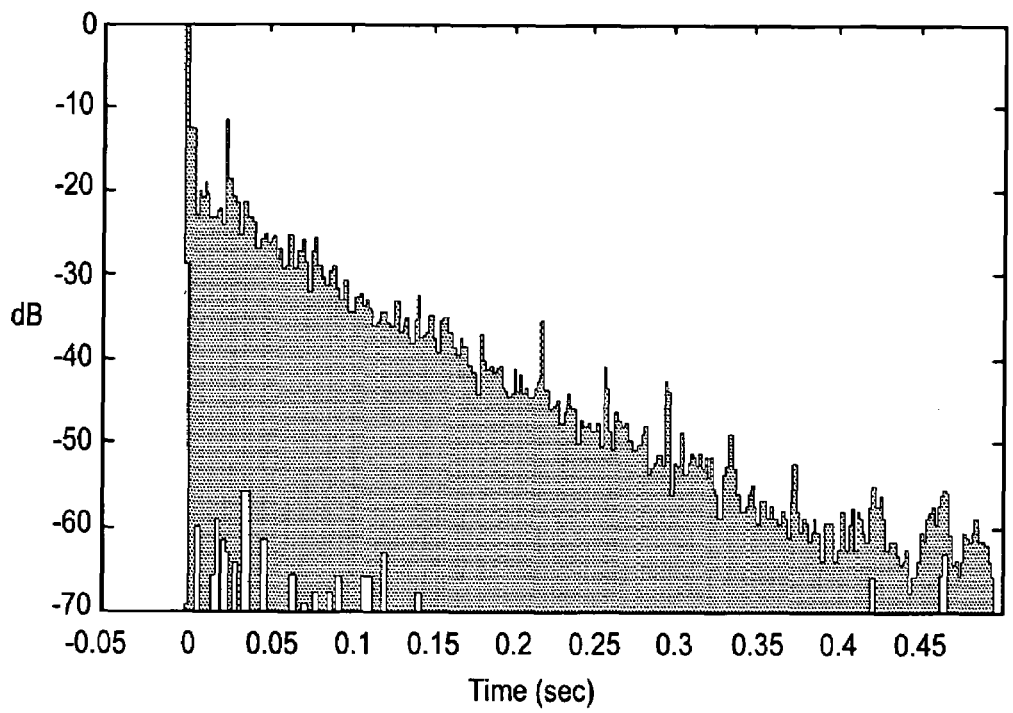
FIG. 2 shows an impulse response for echoic data set according to an embodiment of the present invention.

A method implementing the present invention was evaluated on real data recorded in an anechoic room and in a strongly echoic environment. As shown in FIG. 2, the measured impulse response for the echoic environment revealed a reverberation time of about 500 msec.

The real-time method was successful in separating voices from anechoic mixtures, even when sources had similar spectral power characteristics. The method generally separates at least one voice in echoic voice mixtures, while achieving about three to four-dB segmental SNR improvement on average. A frame size of 512 samples was chosen.

Figure 3:
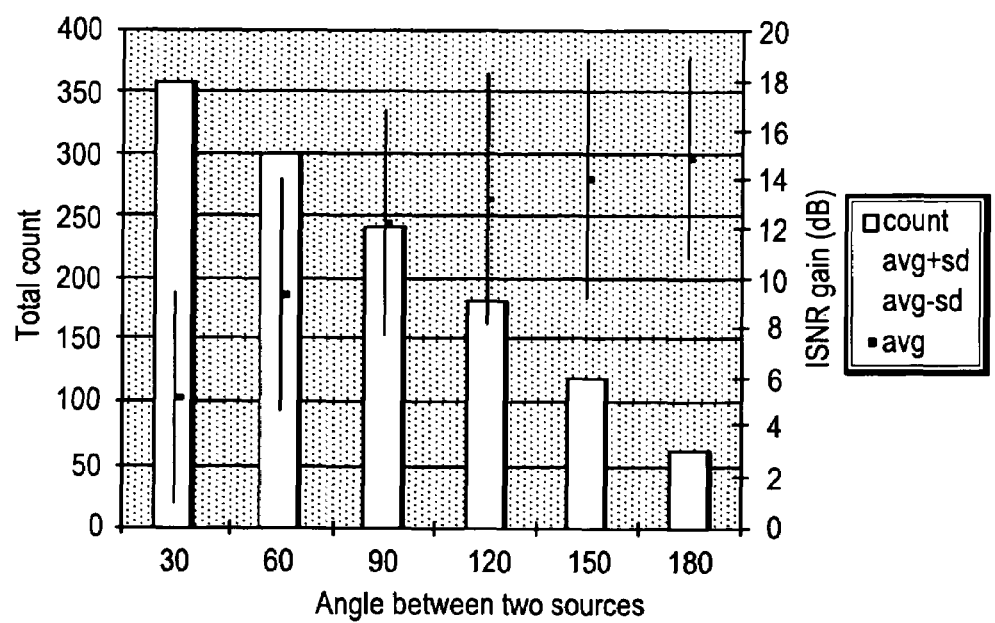
FIG. 3 shows a Segmental signal-to-noise ratio (SNR) separation results as a function of the difference in angles of arrival for anechoic data set according to an embodiment of the present invention.
Figure 4:
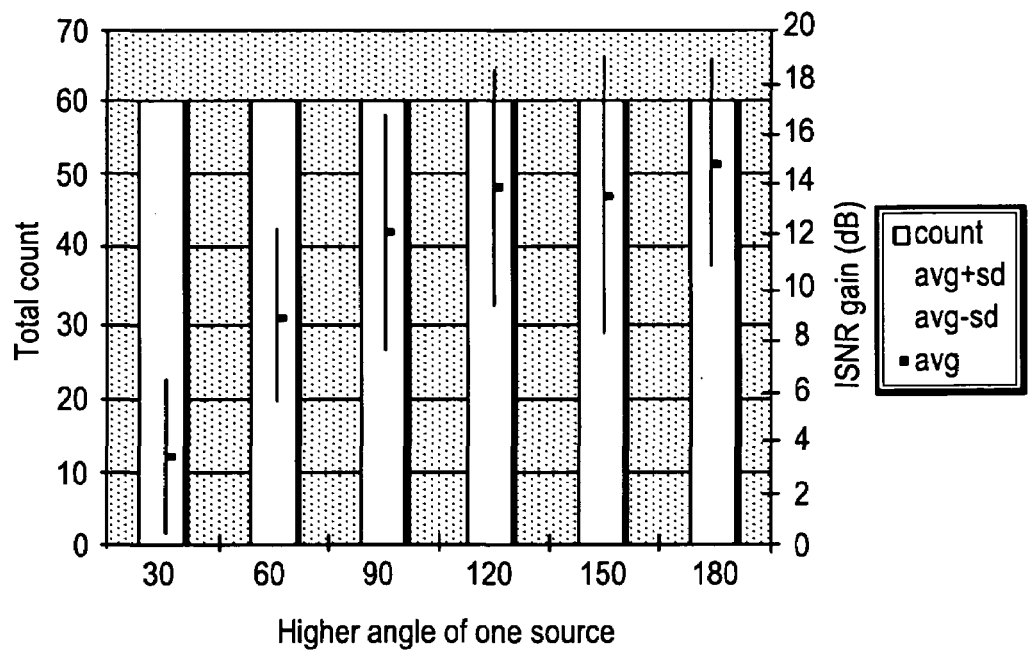
FIG. 4 shows a segmental SNR separation results as a function of the higher angle of one of the two sources for anechoic data set according to an embodiment of the present invention.

For anechoic data sets, FIG. 3 shows a segmental SNR separation as a function of angle of arrival of a wave front (data set). FIG. 4 shows a segmental SNR separation results as a function of a two sources for anechoic data at different angles.

Figure 6:
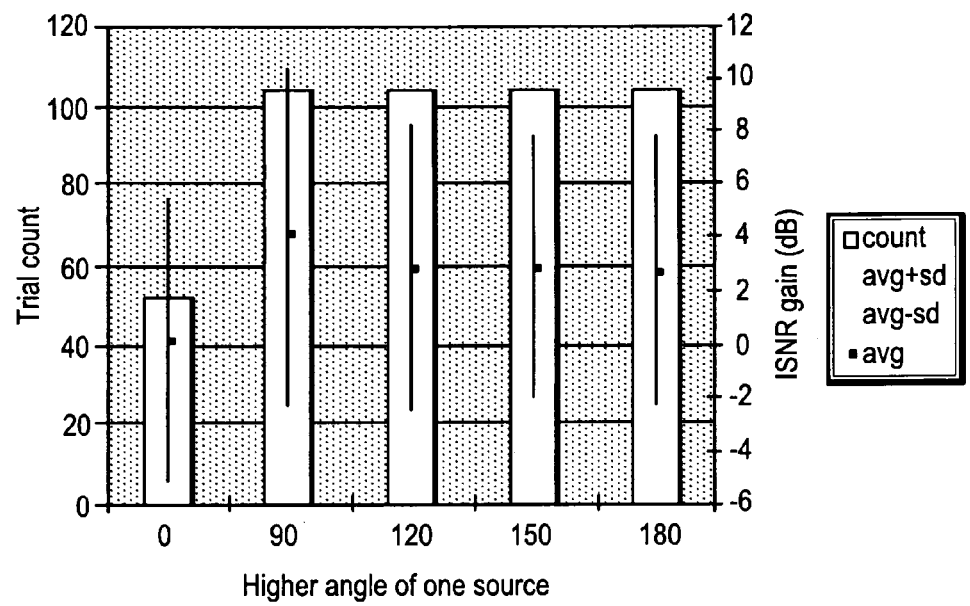
FIG. 6 shows a segmental SNR separation results as a function of the higher angle of one of the two sources for echoic data set according to an embodiment of the present invention.

Results for echoic data sets are shown in FIGS. 5 and 6. FIG. 5 shows a segmental SNR separation results as a function of different in angles of arrival for echoic data set. FIG. 6 shows a segmental SNR separation results as a function of a higher angle of one of the two sources for echoic data set.

Figure 7:
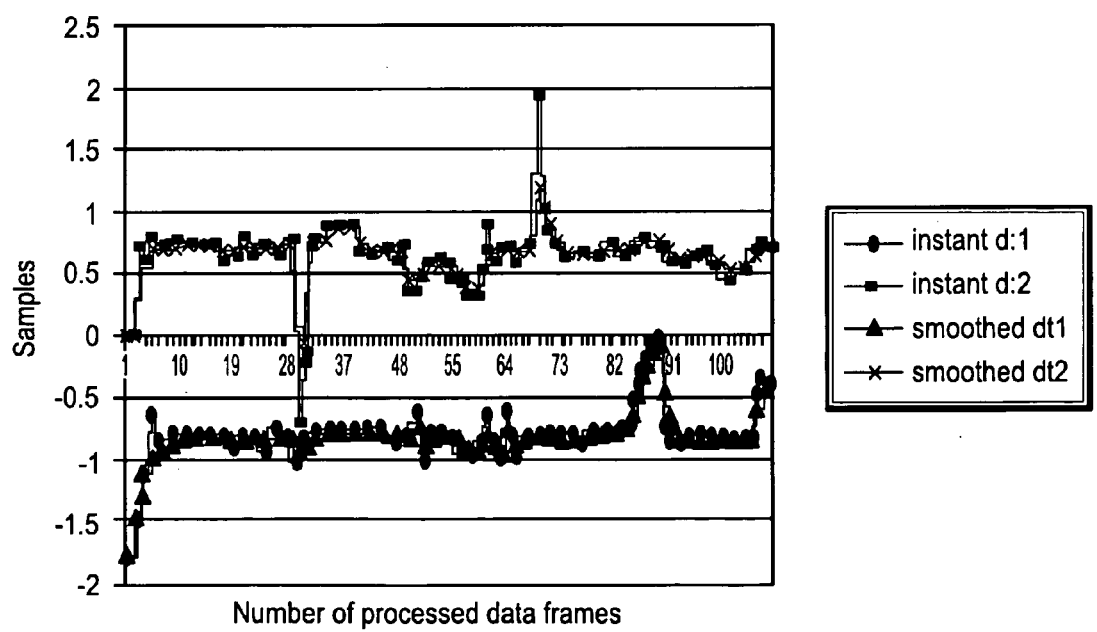
FIG. 7 illustrates an evolution of absolute and smoothed delay parameters (in samples) as a function of the number of frames processed for an anechoic example according to an embodiment of the present invention.
Figure 8:
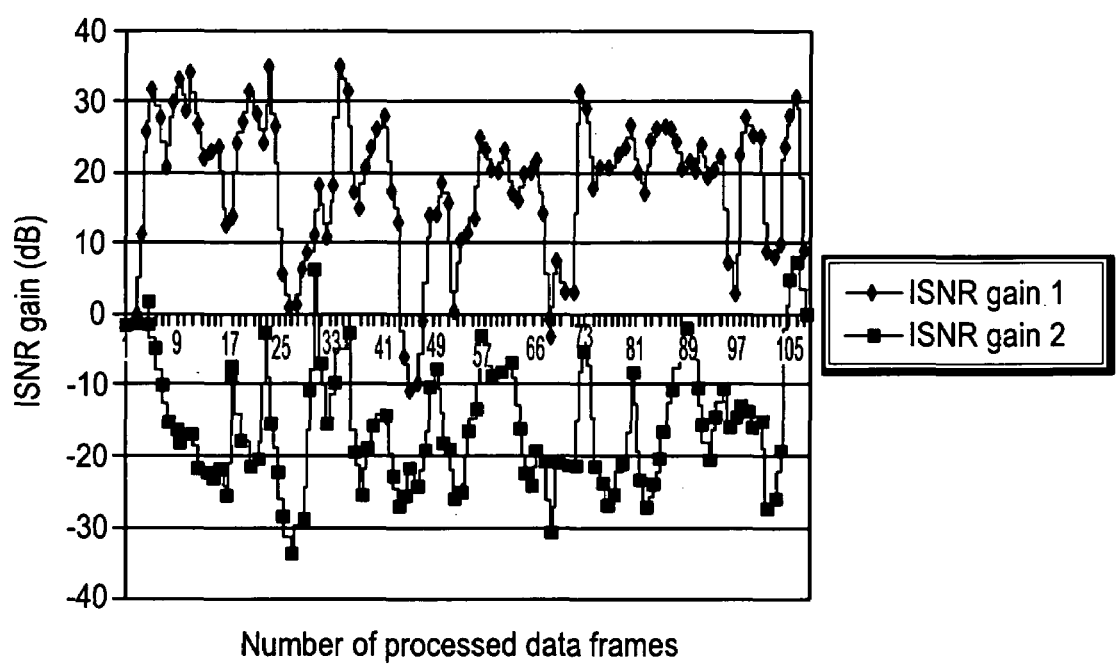
FIG. 8 shows the evolution of the instantaneous SNR for the example in FIG. 6 according to an embodiment of the present invention.

The delay estimation method converges close to the true delay values provided voice is present after processing only about 150–200 milliseconds of anechoic data or about 2500 samples at 16 kHz sampling frequency. FIGS. 7 and 8 exemplify the convergence and variation in the delay estimates and the instantaneous SNR as an online method progresses as a function of the number of data frames processed.

The present invention has been tested on more than one thousand combinations of voices recorded in real anechoic and echoic environments. The performance of the system is good on anechoic data. Although the method is designed for anechoic environments, its complexity and performance on real data represent a basis for designing more complex approaches to deal with reverberant environments.

Having described embodiments for a method of audio source separation by delay and attenuation compensation, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method for separating at least two audio channels recorded using an array of at least two microphones comprising the steps of:

equalizing variances of a first channel and a second channel on a current data frame;

recursively expressing means and variances of mixtures;

normalizing the second channel to a variance level substantially similar to a variance of the first channel; and determining delay parameters by minimizing a cross-covariance between two outputs.

2. The method of claim 1, wherein on a current block of m data samples $x_j(t)$, $1 \leq t \leq m$ $1 \leq j \leq 2$, and index k, a current block mean $\bar{x}_j$ can be determined according to:

$$\bar{x}_j = \frac{1}{m} \sum_{t=1}^{m} x_j(t)$$

3. The method of claim 1, wherein a running mean $\bar{x}_j^{(k-1)}$ can be updated by:

$$\bar{x}_j^{(k)} = (1-\beta)\bar{x}_j^{(k-1)} + \beta \bar{x}_j$$

where $\beta$ is a learning rate.

4. The method of claim 1, wherein a current block variance $Var_j$ is determined according to:

$$Var_j = \frac{1}{m} \sum_{t=1}^{m} |x_j(t) - \bar{x}_j^{(k)}|^2$$

5. The method of claim 1, wherein a running variance $v_j^{(k-1)}$ is updated by:

$$v_j^{(k)} = (1-\beta)v_j^{(k-1)} + \beta Var_j$$

6. The method of claim 1, wherein the step of normalizing the second channel further comprises normalizing an average energy to be similar to an average energy of the first channel according to:

$$\hat{x}_2 = \sqrt{\frac{v_1^{(k)}}{v_2^{(k)}}} x_2$$

7. The method of claim 1, wherein the cross-covariance between the outputs is expanded as:

$$R_{y_1 y_2}(\tau) = R_{x_1 x_1}(d_1 - d_2 + \tau) - R_{x_1 x_2}(d_2 - \tau) - R_{x_1 x_2}(d_1 + \tau) + R_{x_2 x_2}(\tau)$$

where $R_{x_i x_j}$ is the cross-correlation between $x_i$ and $x_j$, $1 \leq i$, $j \leq 2$.

8. The method of claim 1, further comprising the step of determining sub-unit-delayed versions of cross-correlations, wherein the delay parameters are determined for a number of lags L.

9. A method for separating at least two audio channels recorded using an array of at least two microphones comprising the steps of:

constraining a mixing model of the at least two audio channels in a time domain to direct path signal components;

defining a plurality of delays with respect to a midpoint between microphones, wherein delays depend on the distance between sensors and the speed of sound;

inverting a mixing matrix, corresponding to the mixing model, in the frequency domain; and compensating for a plurality of true fractional delays and attenuations in the time domain, wherein values of the delays and attenuations are determined from an output decorrelation constraint.

10. The method of claim 9, further comprising the step of estimating a complex filter for each microphone, wherein the complex filters define the mixing model.

11. The method of claim 9, wherein the mixing matrix corresponding to the mixing model comprises two delay parameters and two parameters corresponding to the speed of sound.

12. The method of claim 9, wherein the output decorrelation constraint is a function of two unknown delays and unknown scalar coefficients.

13. The method of claim 12, wherein the unknown scalar coefficients are attenuation coefficients substantially equal to one.

14. The method of claim 9, further comprising the step of imposing a minimum variance criterion for a reverberant case over all linear filtering combinations of $X_1$ and $X_2$.

15. A program storage device readable by machine, tangibly embodying a program of instructions executable by the machine to perform method steps for separating at least two audio channels recorded using an array of at least two microphones, the method steps comprising:

equalizing variances of a first channel and a second channel on a current data frame;

recursively expressing means and variances of mixtures;

normalizing the second channel to a variance level substantially similar to a variance of the first channel; and determining delay parameters by minimizing a cross-covariance between two outputs.

* * * * *